United States Patent
Isono et al.

(10) Patent No.: US 10,557,439 B2
(45) Date of Patent: Feb. 11, 2020

(54) INJECTION DEVICE, COMBUSTOR, AND ROCKET ENGINE WITH RESTRICTORS SHAPED TO AMPLIFY PREDETERMINED PRESSURE OSCILLATION

(71) Applicant: MITSUBISHI HEAVY INDUSTRIES, LTD., Tokyo (JP)

(72) Inventors: Mitsunori Isono, Tokyo (JP); Kazufumi Ikeda, Tokyo (JP); Hiroyasu Manako, Tokyo (JP); Shinichiro Watanabe, Tokyo (JP); Hideto Kawashima, Ibaraki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 148 days.

(21) Appl. No.: 15/771,256

(22) PCT Filed: Oct. 20, 2016

(86) PCT No.: PCT/JP2016/081162
§ 371 (c)(1),
(2) Date: Apr. 26, 2018

(87) PCT Pub. No.: WO2017/077873
PCT Pub. Date: May 11, 2017

(65) Prior Publication Data
US 2018/0320634 A1    Nov. 8, 2018

(30) Foreign Application Priority Data
Nov. 2, 2015   (JP) .................................. 2015-215976

(51) Int. Cl.
*F02K 9/52*   (2006.01)
*F02K 9/62*   (2006.01)
(Continued)

(52) U.S. Cl.
CPC ................... *F02K 9/52* (2013.01); *F02K 9/42* (2013.01); *F02K 9/44* (2013.01); *F02K 9/62* (2013.01);
(Continued)

(58) Field of Classification Search
CPC ..... F02K 9/42; F02K 9/44; F02K 9/52; F02K 9/60; F02K 9/62; F02K 9/95
See application file for complete search history.

(56) References Cited

U.S. PATENT DOCUMENTS

| | | | |
|---|---|---|---|
| 6,698,184 B1 | 3/2004 | Sowa | |
| 2006/0213181 A1* | 9/2006 | Sarigul-Klijn | ............ F02K 9/72 60/251 |
| 2014/0284394 A1 | 9/2014 | James et al. | |

FOREIGN PATENT DOCUMENTS

| | | |
|---|---|---|
| JP | 61-66851 | 4/1986 |
| JP | 2006-97639 | 4/2006 |

(Continued)

OTHER PUBLICATIONS

Office Action with Search Report dated Feb. 20, 2019 in Russian Patent Application No. 2018118410.
(Continued)

*Primary Examiner* — William H Rodriguez
*Assistant Examiner* — Kyle Robert Thomas
(74) *Attorney, Agent, or Firm* — Wenderoth, Lind & Ponack, L.L.P.

(57) ABSTRACT

An injection device, a combustor, and a rocket engine include a device main body partitioned into a fuel manifold and an oxidant manifold, and a plurality of injectors arranged at predetermined intervals in the device main body to inject fuel and oxidant into a combustion chamber, each of the injectors includes a LOx channel including a proximal end portion communicating with the oxidant manifold and a
(Continued)

distal end portion communicating with the combustion chamber, a restrictor provided on the proximal end portion of the LOx channel and a $GH_2$ channel including a proximal end portion communicating with the fuel manifold and a distal end portion communicating with the combustion chamber, and the restrictors have different shapes.

6 Claims, 7 Drawing Sheets

(51) Int. Cl.
    *F23R 3/28*     (2006.01)
    *F02K 9/44*     (2006.01)
    *F02K 9/42*     (2006.01)
    *F02K 9/95*     (2006.01)

(52) U.S. Cl.
    CPC .................. *F02K 9/95* (2013.01); *F23R 3/28* (2013.01); *F05D 2220/80* (2013.01); *F05D 2270/14* (2013.01); *F23R 2900/00014* (2013.01)

(56) References Cited

FOREIGN PATENT DOCUMENTS

| | | |
|---|---|---|
| JP | 2008-202542 | 9/2008 |
| JP | 2010-236386 | 10/2010 |
| JP | 2014-37838 | 2/2014 |
| JP | 2014-520997 | 8/2014 |
| RU | 2 120 560 | 10/1998 |
| RU | 2 218 473 | 8/2003 |
| RU | 2 225 947 | 3/2004 |
| RU | 2 450 155 | 5/2012 |

OTHER PUBLICATIONS

International Search Report dated Dec. 13, 2016 in International (PCT) Application No. PCT/JP2016/081162.
Written Opinion of the International Searching Authority dated Dec. 13, 2016 in International (PCT) Application No. PCT/JP2016/081162.

\* cited by examiner

INJECTION DEVICE, COMBUSTOR, AND ROCKET ENGINE WITH RESTRICTORS SHAPED TO AMPLIFY PREDETERMINED PRESSURE OSCILLATION

FIELD

The present invention relates to an injection device used for a rocket engine mixing oxidant with fuel and combusting the mixture to obtain thrust, a combustor to which the injection device is applied, and a rocket engine to which the combustor is applied.

BACKGROUND

A rocket combustor mounted on a rocket engine includes an injection device including a number of injectors, a combustion chamber, and a nozzle, and converts energy obtained by chemical reaction of fuel serving as a propellant into flue gas motion to obtain thrust. Specifically, a rocket combustor has a structure in which fuel (such as hydrogen gas: $GH_2$) and oxidant (such as liquid oxygen: LOx) are injected from each of the injectors into the combustion chamber and ignited, thereafter combustion gas generated inside the combustion chamber is expanded with the nozzle and discharged in a combustion gas discharge direction to generate thrust.

Examples of these rocket combustors include those disclosed in the following patent literatures.

CITATION LIST

Patent Literature

Patent Literature 1: Japanese Patent Application Laid-open No. 2008-202542
Patent Literature 2: Japanese Patent Application Laid-open No. 2014-037838

SUMMARY

Technical Problem

An injection device of a rocket combustor includes a number of injectors, and has natural frequencies of air columns corresponding to the lengths of the injectors. Because the rocket engine includes a number of injectors having the same length, resonance frequencies concentrate on a specific frequency, and the frequency easily causes fluid fluctuations of the injectors. For this reason, the fluid fluctuations of the injectors are transmitted to the combustion chamber, and pressure oscillation occurs in the combustion chamber.

An object of the present invention is to solve the problem described above, and provide an injection device, a combustor, and a rocket engine suppressing increase in size while suppressing occurrence of combustion oscillation.

Solution to Problem

To achieve the object, an injection device according to the present invention includes a device main body partitioned into a fuel manifold and an oxidant manifold, and a plurality of injectors arranged at predetermined intervals in the device main body and inject fuel and oxidant into a combustion chamber. The plurality of injectors each includes an oxidant channel including a proximal end portion communicating with the oxidant manifold and a distal end portion communicating with the combustion chamber, a restrictor provided on the proximal end portion of the oxidant channel, and a fuel channel including a proximal end portion communicating with the fuel manifold and a distal end portion communicating with the combustion chamber. The restrictors in the plurality of injectors have different shapes.

Accordingly, a plurality of injectors are arranged in the device main body, and the restrictors have different shapes, whereby resonance frequencies of the injectors concentrating on a specific frequency in the case where the restrictors have the same shape are distributed into a plurality of frequencies. For this reason, excessive pressure oscillation in the combustion chamber at a specific frequency caused by transmission of the injection pressure fluctuations is also distributed into a plurality of frequencies, and the amplitude is reduced. This structure suppresses increase in size of the injection device while suppressing occurrence of combustion oscillation.

In the injection device according to the present invention, the restrictors of the plurality of injectors have different lengths.

Accordingly, the structure is simplified, by causing the restrictors to have different lengths to set the shapes of the restrictors in the injectors to different shapes.

In the injection device according to the present invention, the restrictors of the plurality of injectors have different internal diameters.

Accordingly, the structure is simplified, by causing the restrictors to have different internal diameters to set the shapes of the restrictors in the injectors to different shapes.

In the injection device according to the present invention, the plurality of injectors are arranged concentrically in the device main body along a radial direction, and the restrictors of the plurality of injectors arranged along the radial direction have different shapes.

This structure enables proper distribution of excessive injector pressure fluctuations at a specific frequency occurring in the case where the restrictors have the same shape into a plurality of frequencies, and reduction in the excessive injector pressure fluctuations.

In the injection device according to the present invention, shapes of the restrictors in the plurality of injectors are set different in accordance with a pressure oscillation mode occurring in the combustion chamber.

With this structure, the restrictors are set to have different shapes, in accordance with the pressure oscillation mode in the combustion chamber. This structure effectively reduces pressure oscillation occurring in the combustion chamber.

In the injection device according to the present invention, the shapes of the restrictors are set to amplify pressure oscillation of a preset certain frequency, and the combustion chamber communicates with a resonator configured to attenuate the pressure oscillation of the certain frequency.

With this structure, although the pressure oscillation of the certain frequency is amplified according to the set shapes of the restrictors, pressure oscillation of the other frequencies is reduced, and the amplified pressure oscillation is attenuated with the resonator. This structure reduces pressure oscillation occurring in the combustion chamber as a whole.

A combustor according to the present invention includes the injection device, a combustion chamber configured to combust oxidant and fuel injected from the injection device to generate combustion gas, and a nozzle configured to inject the combustion gas generated in the combustion chamber.

With this structure, when the injection device injects oxidant and fuel into the combustion chamber, combustion gas is generated by combustion of the oxidant and the fuel in the combustion chamber and injected from the nozzle. The injector pressure fluctuations occurring when the oxidant is injected from the injectors are distributed into a plurality of frequencies. For this reason, pressure oscillation in the combustion chamber that occurs due to transmission of the injector pressure fluctuations is also distributed into a plurality of frequencies, and the amplitude reduces.

A rocket engine according to the present invention includes the combustor, an oxidant supply device configured to supply oxidant to the combustor, and a fuel supply device configured to supply fuel to the combustor.

With this structure, injector pressure fluctuations occurring when the oxidant is injected from the injectors are distributed into a plurality of frequencies. For this reason, pressure oscillation in the combustion chamber that occurs due to transmission of the injector pressure fluctuations is also distributed into a plurality of frequencies, and the amplitude reduces. This structure suppresses increase in size of the injection device while suppressing occurrence of combustion oscillation.

Advantageous Effects of Invention

The injection device, the combustor, and the rocket engine according to the present invention have the structure in which shapes of the restrictors of the oxidant channels in the injectors are set different, and injector pressure fluctuations are distributed into a plurality of frequencies. With this structure, pressure oscillation occurring in the combustion chamber due to transmission of the injector pressure fluctuations is also distributed into a plurality of frequencies, and the amplitude is reduced. This structure suppresses increase in size of the injection device while suppressing occurrence of combustion oscillation.

DESCRIPTION OF EMBODIMENTS

The following is a detailed explanation of preferred embodiments of an injection device, a combustor, and a rocket engine according to the present invention with reference to drawings. The present invention is not limited to the embodiments. In addition, when a plurality of embodiments exist, the present invention also include structures obtained by combining the embodiments.

First Embodiment

Figure 1:
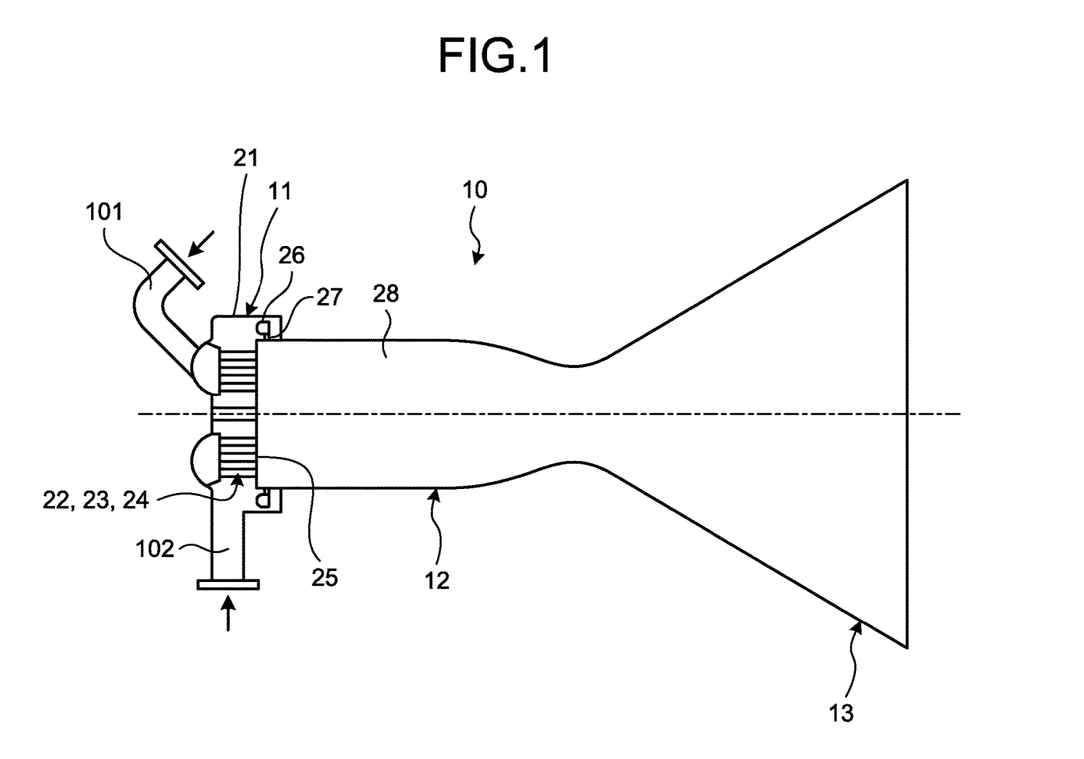
FIG. 1 is a schematic diagram illustrating a combustor according to a first embodiment.
Figure 2:
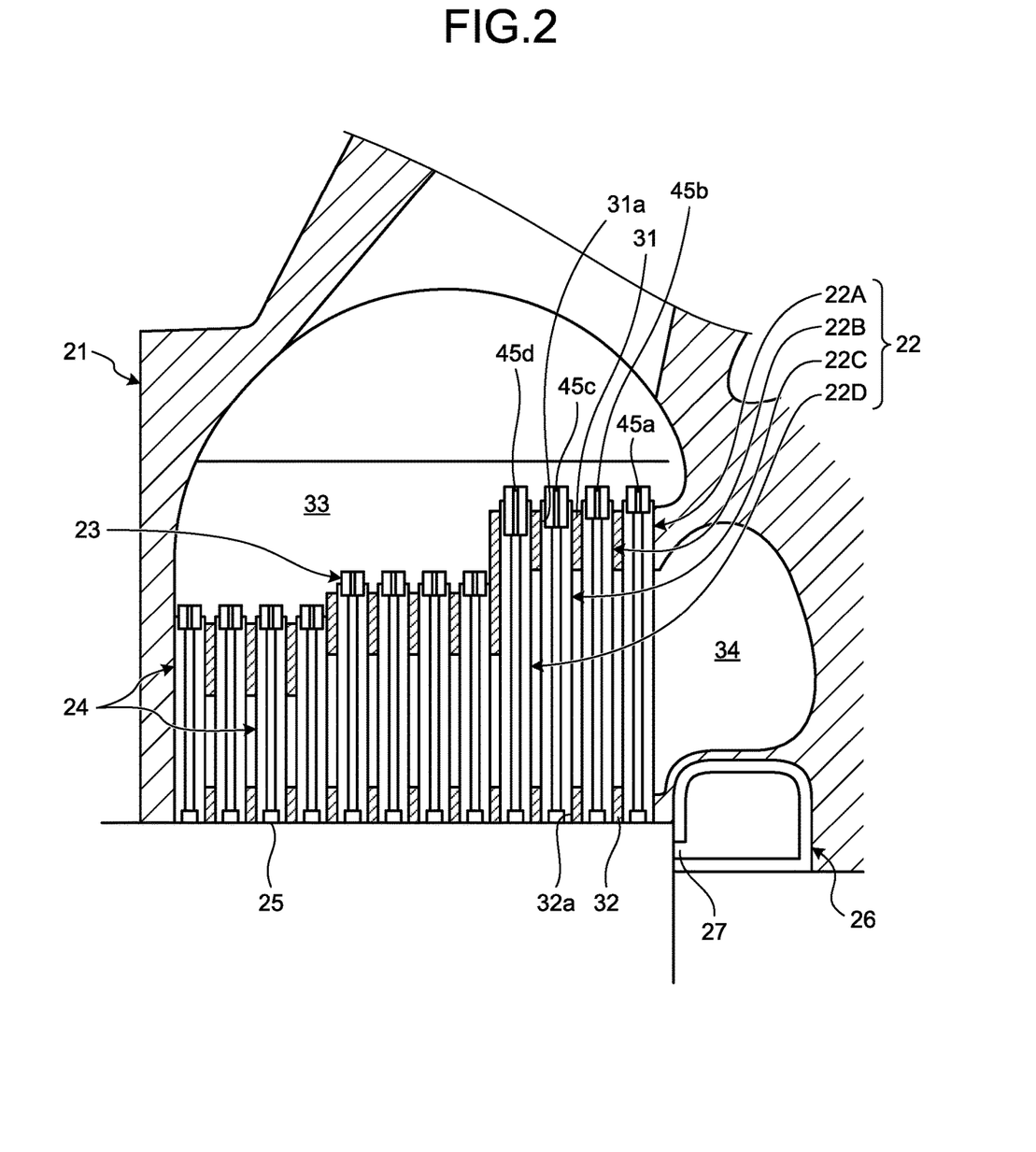
FIG. 2 is a schematic diagram illustrating an injection device according to the first embodiment.
Figure 3:
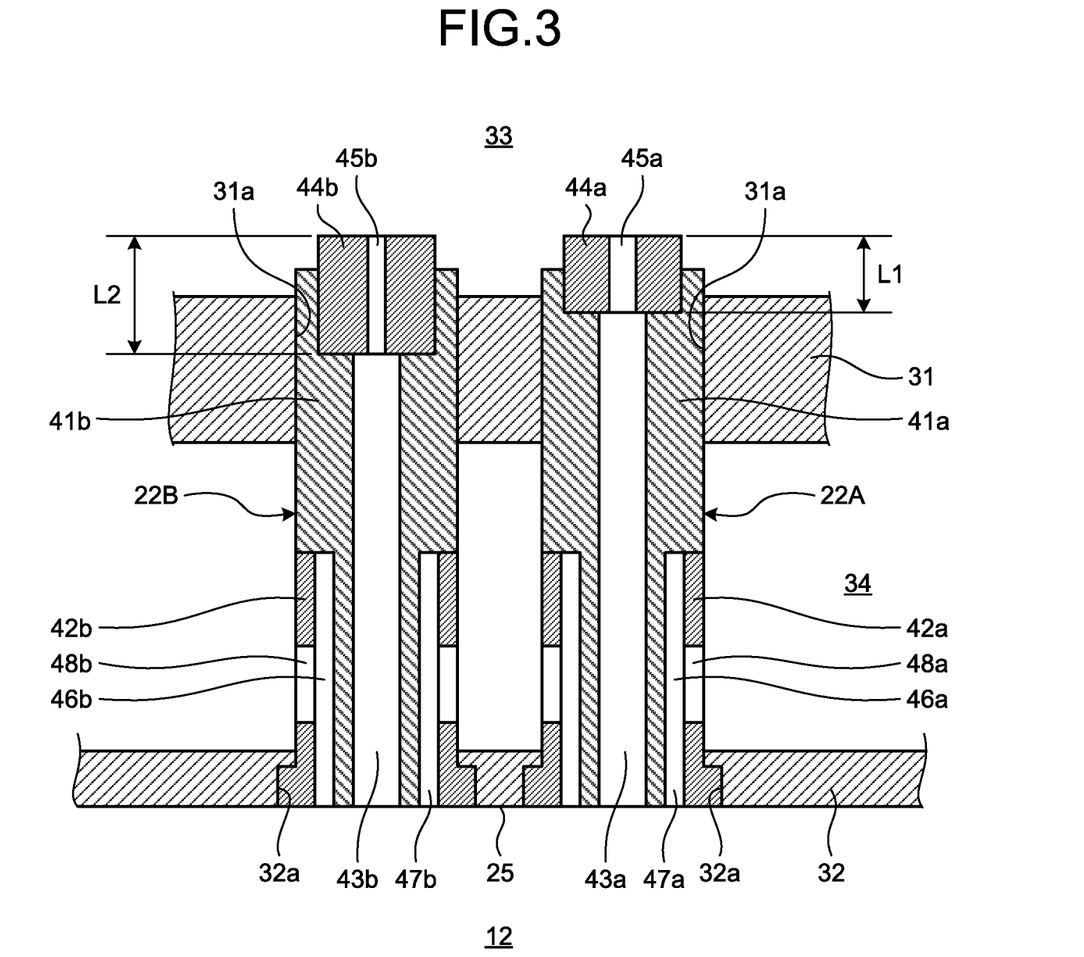
FIG. 3 is a schematic diagram illustrating injectors.

FIG. 1 is a schematic diagram illustrating a combustor according to the first embodiment, FIG. 2 is a schematic diagram illustrating an injection device according to the first embodiment, and FIG. 3 is a schematic diagram illustrating injectors.

In the first embodiment, as illustrated in FIG. 1, a combustor 10 includes an injection device 11, a combustion chamber 12, and a nozzle 13, and obtains thrust by converting energy obtained by chemical reaction of fuel serving as a propellant into flue gas motion. Specifically, liquid oxygen and hydrogen gas injected from the injection device 11 to the combustion chamber 12 are mixed to combust in the combustion chamber 12. In this manner, combustion gas is generated, and the outlet of the combustion gas injected from the combustion chamber 12 with the nozzle 13 is narrowed, to obtain thrust.

As illustrated in FIG. 1 and FIG. 2, the injection device 11 has a structure in which a plurality of injectors 22, 23, and 24 are arranged in an injection device main body 21, and each of the injectors 22, 23, and 24 is capable of injecting fuel and oxidant from an injection surface 25 toward the inside of the combustion chamber 12. In this case, the injectors 22, 23, and 24 are arranged concentrically in the injection device main body 21 along a radial direction thereof. Each of the injectors 22 is disposed on an external circumferential side of the injection device main body 21, each of the injectors 23 is disposed on a more internal circumferential side than the injectors 22, and each of the injectors 24 is disposed on a more internal circumferential side than the injectors 23, that is, in a central portion. The injectors 22 are longest, and the injectors 24 are shortest.

The injection device main body 21 is partitioned into an oxidant manifold 33 and a fuel manifold 34 with a first partition wall 31 and a second partition wall 32 being parallel with each other. The oxidant manifold 33 is connected with an oxidant supply line 102, and the fuel manifold 34 is connected with the fuel supply line 101. Each of the injectors 22, 23, and 24 has a proximal end portion supported by a through hole 31a of the first partition wall 31, and a distal end portion supported by a through hole 32a of the second partition wall 32. Because the injectors 22, 23, and 24 have the same basic structure, although they are different in length, the following explanation illustrates only the injectors 22.

As illustrated in FIG. 2 and FIG. 3, the injectors 22 have a structure in which a plurality of injectors 22A, 22B, 22C, and 22D are arranged along a radial direction. The injectors 22A, 22B, 22C, and 22D are the same injectors arranged concentrically. The injector 22A includes a LOx post 41a serving as an internal cylinder, and a sleeve 42a serving as an external cylinder. The LOx post 41a is formed in a cylindrical shape, and a LOx channel 43a serving as an oxidant channel is formed inside thereof. The LOx post 41a has a proximal end portion to which an introduction portion 44a is fixed, and a restrictor (orifice) 45a is formed in the introduction portion 44a. The restrictor 45a concentrically communicates with the LOx channel 43a, and has a channel area smaller than the channel area of the LOx channel 43a. The restrictor 45a communicates with the oxidant manifold 33, and the LOx channel 43a communicates with the combustion chamber 12. The LOx chamber 43a and the restrictor 45a may have any shape, such as a circular shape, an oval shape, a rectangular shape, and a long-hole shape.

The LOx post 41a is provided with a recessed portion 46a on an external circumferential surface on the distal end portion side thereof. The recessed portion 46a is formed on a downstream side in a flowing direction of the oxidant (LOx) flowing through the LOx channel 43a, that is, on the combustion chamber 12 side. The recessed portion 46a has a cylindrical shape formed by reducing the external diameter of the LOx post 41a, and is provided to the end portion of the LOx post 41a on the combustion chamber 12 side.

The sleeve 42a is formed in a cylindrical shape concentric with the LOx post 41a, and provided to cover the external circumference of the LOx post 41a. The sleeve 42a has an external diameter set equal to the external diameter of the LOx post 41a, and an internal diameter set larger than the external diameter of the recessed portion 46a. The sleeve 42a includes a proximal end portion abut against the proximal end portion side of the recessed portion 46a, and a distal end portion connected with the injection surface 25 of the combustion chamber 12. For this reason, the sleeve 42a includes an internal circumferential surface covering the external circumferential surface of the recessed portion 46a of the LOx post 41a, to form a $GH_2$ channel 47a serving as a fuel channel between the LOx post 41a and the sleeve 42a.

The $GH_2$ channel 47a has a channel cross section having an annular shape, and is concentric with the LOx channel 43a. The sleeve 42a is also provided with an introduction port 48a communicating with the $GH_2$ channel 47a from the external circumferential surface thereof, and the introduction port 48a communicates with the fuel manifold 34.

For this reason, the oxidant supplied from the oxidant supply line 102 to the oxidant manifold 33 is taken into the LOx channel 43a through the restrictor 45a, to enable injection of the oxidant from the distal end portion to the combustion chamber 12. By contrast, the hydrogen gas supplied from the fuel supply line 101 to the fuel manifold 34 is taken into the $GH_2$ channel 47a through the introduction port 48a, to enable injection of the hydrogen gas from the distal end portion to the combustion chamber 12.

The injector 22B has substantially the same structure as that of the injector 22A. Although a detailed explanation of the injector 22B is omitted, the injector 22B includes an LOx post 41b serving as an internal cylinder, a sleeve 42b serving as an external cylinder, a LOx channel 43b serving as an oxidant channel, an introduction portion 44b, a restrictor (orifice) 45b, a recessed portion 46b, a $GH_2$ channel 47b serving as a fuel channel, and an introduction port 48b. The injectors 22C and 22D also have the same structure.

With reference to FIG. 1 and FIG. 2 again, the combustor 10 is provided with a resonator 26 suppressing combustion oscillation. The resonator 26 is disposed outside the combustion chamber 12 in the injection device main body 21, and communicates with the combustion chamber 12 through a communication path 27.

The combustion chamber 12 combusts liquid oxygen and hydrogen gas injected from the injectors 22, 23, and 24. The liquid oxygen and the hydrogen gas injected from the injectors 22, 23, and 24 are atomized inside the combustion chamber 12, and mixed and combusted. The combustion chamber 12 includes a circumferential wall portion 28 having a cylindrical shape. The circumferential wall portion 28 includes an internal circumferential surface orthogonal to the injection surface 25, to define the inside of the combustion chamber 12.

The injection surface 25 is a surface injecting liquid oxygen and hydrogen gas into the combustion chamber 12, and is formed in a circular shape. Injection ports of the injectors 22, 23, and 24 are exposed in the surface of the injection surface 25. The injectors 22, 23, and 24 (injection ports) are arranged concentrically on the injection surface 25 and aligned in a radial direction of the injection surface 25. The circumferential wall portion 28 includes one end portion in an axial direction (longitudinal direction) provided with the injection surface 25, and the other end portion provided with the nozzle 13. The circumferential wall portion 28 of the combustion chamber 12 is provided with a cooling path (not illustrated).

The combustion chamber 12 has a substantially fixed internal diameter, but is narrowed with an internal diameter gradually narrowed toward the nozzle 13 side in an axial direction. The nozzle 13 is formed to connect with the circumferential wall portion 28 of the combustion chamber 12, and includes an inside communicating with the combustion chamber 12. The nozzle 13 injects combustion gas generated in the combustion chamber 12, to obtain thrust.

In the injectors 22 structured as described above, the restrictors 45a, 45b, 45c, and 45d in the injectors 22A, 22B, 22C, and 22D have different shapes, as illustrated in FIG. 2 and FIG. 3. Specifically, the restrictors 45a, 45b, 45c, and 45d have different lengths in the injectors 22A, 22B, 22C, and 22D. In this case, the injectors 22A, 22B, 22C, and 22D are arranged concentrically in the injection device main body 21 along a radial direction thereof. The restrictors 45a, 45b, 45c, and 45d have different lengths in the injectors 22A, 22B, 22C, and 22D arranged along the radial direction.

For example, when an axial length L1 is set for the restrictor 45a (introduction portion 44a) in the injector 22A and an axial length L2 is set for the restrictor 45b (introduction portion 44b) in the injector 22B, the lengths are set to satisfy L1<L2. The lengths of restrictors 45a, 45b, 45c, and 45d in the injectors 22A, 22B, 22C, and 22D are set such that the length increases in order from the injector 22A to the injector 22D. However, setting of the lengths of the restrictors 45a, 45b, 45c, and 45d in the injectors 22A, 22B, 22C, and 22D is not limited to this structure, but the lengths of the restrictors 45a, 45b, 45c, and 45d may be set to decrease in order from the injector 22A to the injector 22D. As another example, the lengths of the restrictors 45a, 45b, 45c, and 45d may be set at random.

Figure 4:
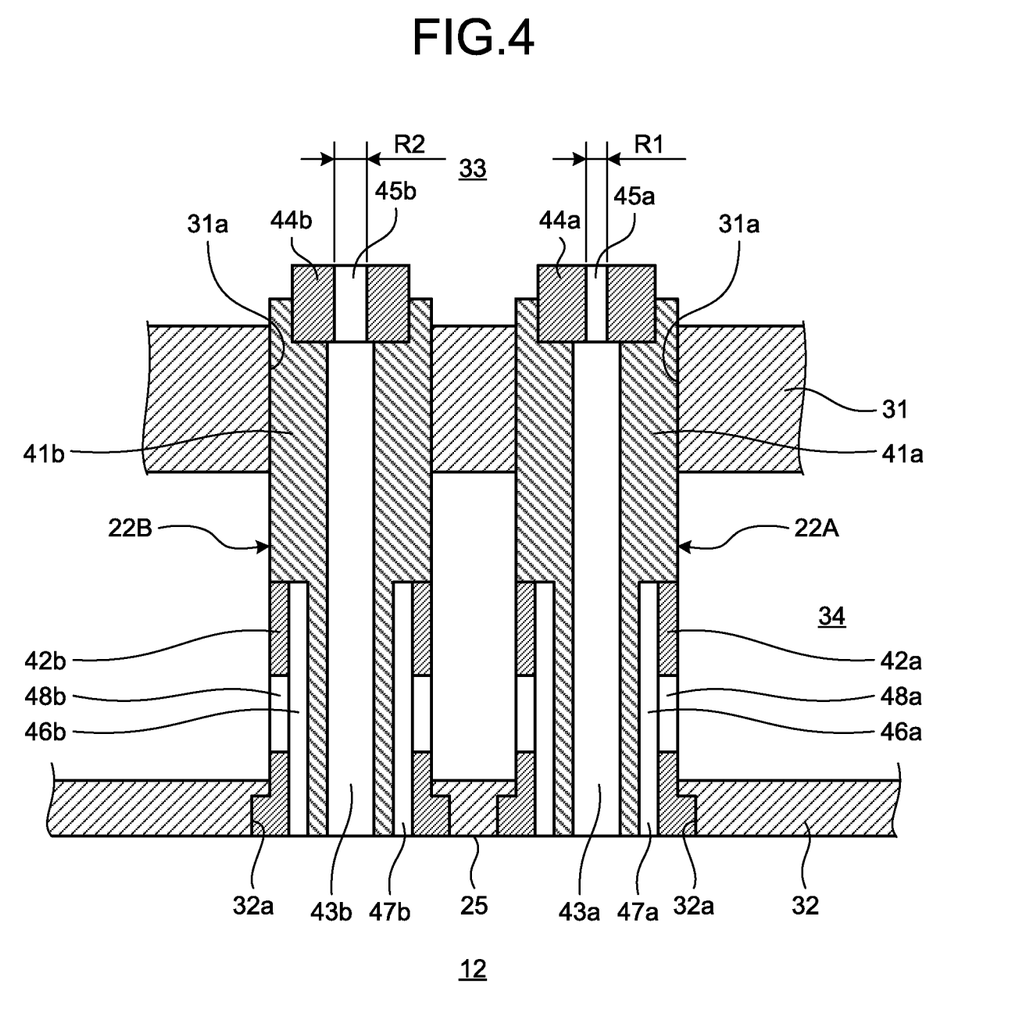
FIG. 4 is a schematic diagram illustrating a modification of the injectors.

The explanation described above illustrates the structure in which the restrictors 45a, 45b, 45c, and 45d have different lengths, as the structure in which the restrictors 45a, 45b, 45c, and 45d in the injectors 22A, 22B, 22C, and 22D have different shapes, but the structure is not limited thereto. FIG. 4 is a schematic diagram illustrating a modification of the injectors.

In the embodiment, as illustrated in FIG. 4, the internal diameters of the restrictors 45a and 45b in the injectors 22A and 22B are set different, to cause the restrictors 45a and 45b to have different shapes in the injectors 22A and 22B. For example, when an internal diameter R1 is set for the restrictor 45a (introduction portion 44a) in the injector 22A and an internal diameter R2 is set for the restrictor 45b (introduction portion 44b) in the injector 22B, the internal diameters are set to satisfy R1<R2. Although not illustrated, the restrictors 45a, 45b, 45c, and 45d in all the injectors 22A, 22B, 22C, and 22D are configured to have different internal diameters.

In the present embodiment, the shapes (length or internal diameter) of the restrictors 45a, 45b, 45c, and 45d in the injectors 22A, 22B, 22C, and 22D are set different. In this manner, the injector pressure fluctuations occurring when oxidant is injected from the injectors 22A, 22B, 22C, and 22D are distributed into a plurality of frequencies. For this reason, pressure oscillation in the combustion chamber 12 that occurs due to transmission of the injector pressure fluctuations is also distributed into a plurality of frequencies, and the amplitude reduces.

Figure 5:
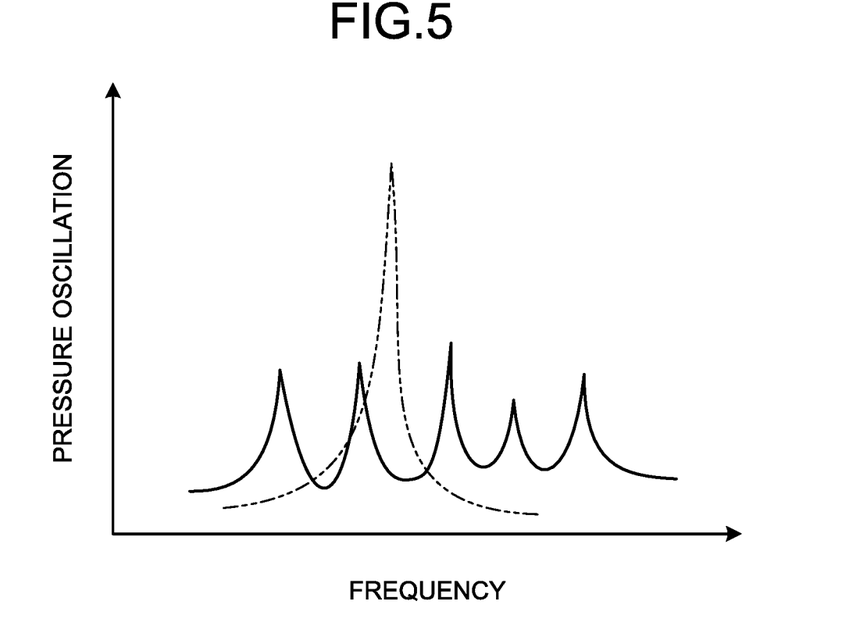
FIG. 5 is a graph illustrating pressure oscillation with respect to the frequency.
Figure 6:
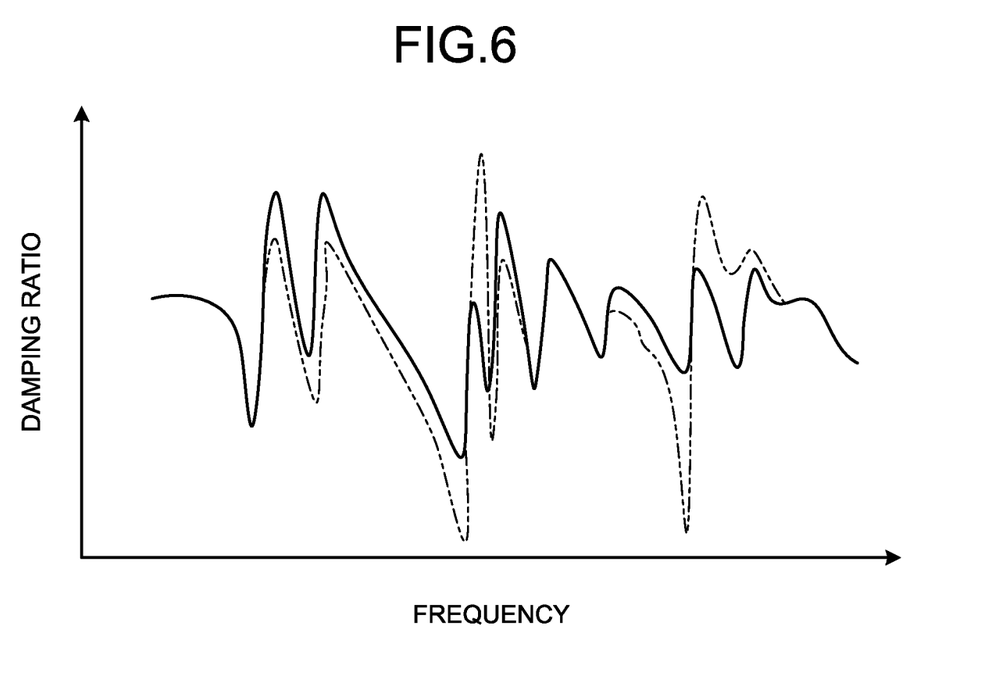
FIG. 6 is a graph illustrating a damping ratio with respect to the frequency.

FIG. 5 is a graph illustrating pressure oscillation with respect to the frequency, and FIG. 6 is a graph illustrating a damping ratio with respect to the frequency.

As illustrated in FIG. 5, when the restrictors 45a, 45b, 45c, and 45d in the injectors 22A, 22B, 22C, and 22D have the same shape, the pressure oscillation in the combustion chamber 12 at a certain frequency becomes maximum, as indicated with a two-dot chain line. By contrast, when the restrictors 45a, 45b, 45c, and 45d in the injectors 22A, 22B, 22C, and 22D have different shapes (lengths or internal diameters), the pressure oscillation is distributed into pressure oscillations in the combustion chamber 12 at a plurality of frequencies to be reduced, as indicated with a solid line.

In addition, as illustrated in FIG. 6, when the restrictors 45a, 45b, 45c, and 45d in the injectors 22A, 22B, 22C, and 22D have the same shape, the damping ratio at each of the frequencies partly becomes minimum, as indicated with a two-dot chain line. By contrast, when the restrictors 45a, 45b, 45c, and 45d in the injectors 22A, 22B, 22C, and 22D have different shapes (lengths or internal diameters), the damping ratio that has become minimum is reduced throughout the frequencies, as indicated with a solid line.

As described above, the injection device according to the first embodiment includes the injection device main body 21 partitioned into the oxidant manifold 33 and the fuel manifold 34, and the injectors 22, 23, and 24 that are arranged at predetermined intervals in the injection device main body 21 and inject fuel and oxidant into the combustion chamber 12, the injectors 22A and 22B (22C and 22D) include the LOx channels 43a and 43b each having a proximal end portion communicating with the oxidant manifold 33 and a distal end portion communicating with the combustion chamber 12, restrictors 45a and 45b provided with the proximal end portions of the LOx channels 43a and 43b, respectively, and the $GH_2$ channels 47a and 47b each having a proximal end portion communicating with the fuel manifold 34 and a distal end portion communicating with the combustion chamber 12, respectively, and the restrictors 45a and 45b (45c and 45d) have different shapes.

Accordingly, because the restrictors 45a and 45b (45c and 45d) have different shapes, the resonance frequencies of the injectors that concentrate on a specific frequency in the case where the restrictors have the same shape are distributed into a plurality of frequencies. This structure distributes excessive injector pressure fluctuations concentrating on a specific resonance frequency occurring when oxidant is injected from the injectors 22A and 22B (22C and 22D). For this reason, excessive pressure oscillation in the combustion chamber 12 at a specific frequency caused by transmission of the injection pressure fluctuations is also distributed into a plurality of frequencies, and the amplitude is reduced.

In the injection device according to the first embodiment, the lengths of the restrictors 45a and 45b (45c and 45d) in the injectors 22A and 22B (22C and 22D) are set different. In this case, the restrictors 45a and 45b (45c and 45d) may have different internal diameters. Accordingly, the structure can be simplified by causing the restrictors to have different lengths or different internal diameters to cause the restrictors 45a and 45b (45c and 45d) in the injectors 22A and 22B (22C and 22D) to have different shapes.

In the injection device according to the first embodiment, the injectors 22A, 22B, 22C, and 22D are arranged concentrically in the injection device main body 21 along the radial direction, to cause the restrictors 45a, 45b, 45c and 45d in the injectors 22A, 22B, 22C and 22D arranged along the radial direction to have different shapes. This structure enables proper distribution of excessive injector pressure fluctuations at a specific frequency occurring in the case where the restrictors have the same shape into a plurality of frequencies, and reduction in the excessive injector pressure fluctuations.

The combustor according to the first embodiment includes the injection device 11 described above, the combustion chamber 12 combusting oxidant and fuel injected from the injection device 11 and generating combustion gas, and the nozzle 13 injecting the combustion gas generated in the combustion chamber 12. With this structure, pressure oscillation occurring in the combustion chamber 12 due to transmission of injector pressure fluctuations is distributed into a plurality of frequencies, and the amplitude is reduced.

In the rocket engine according to the first embodiment, the combustor 10 described above is applied. With this structure, pressure oscillation occurring in the combustion chamber 12 due to transmission of injector pressure fluctuations is distributed into a plurality of frequencies, and the amplitude is reduced.

Second Embodiment

Figure 7:
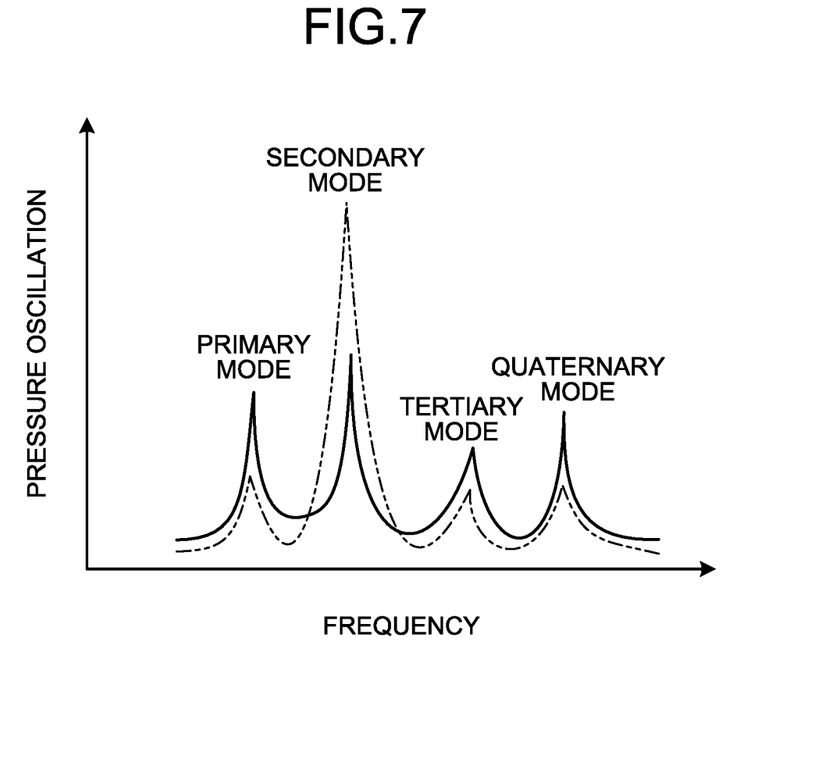
FIG. 7 is a graph illustrating pressure oscillation with respect to the frequency when an injection device according to a second embodiment is applied.

FIG. 7 is a graph illustrating pressure oscillation with respect to the frequency when an injection device according to a second embodiment is applied, and FIG. 8A to FIG. 8D are schematic diagrams illustrating arrangement patterns of injectors in the injection device. The basic structure of the injection device according to the present embodiment is substantially similar to the first embodiment described above. The basic structure will be explained hereinafter with reference to FIG. 3, and the members having similar functions as those in the embodiment described above will be denoted as the same reference numerals, and a detailed explanation thereof is omitted.

According to the second embodiment, as illustrated in FIG. 1 and FIG. 2, the injection device 11 has a structure in which restrictors 45 (45a, 45b, 45c, and 45d) in injectors 22, 23, and 24 are set to have different shapes (lengths or internal diameters), in accordance with the pressure oscillation mode occurring in the combustion chamber 12.

Figure 8A:
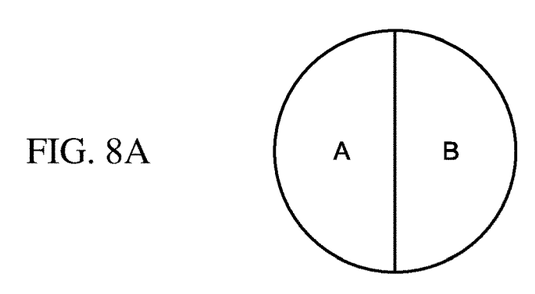
FIG. 8A is a schematic diagram illustrating an arrangement pattern of injectors in the injection device.
Figure 8B:
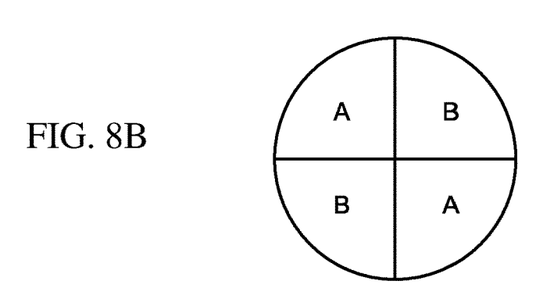
FIG. 8B is a schematic diagram illustrating an arrangement pattern of injectors in the injection device.
Figure 8C:
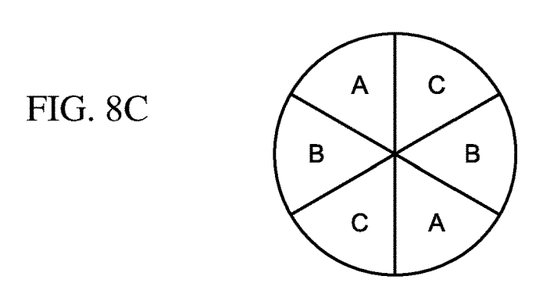
FIG. 8C is a schematic diagram illustrating an arrangement pattern of injectors in the injection device.
Figure 8D:
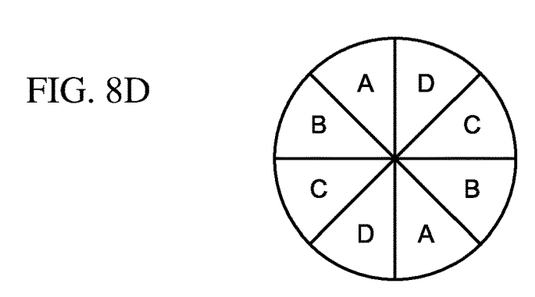
FIG. 8D is a schematic diagram illustrating an arrangement pattern of injectors in the injection device.

As illustrated with a solid line in FIG. 7, pressure oscillation with respect to the frequency occurs in the combustor 10 as a primary mode (FIG. 8A), a secondary mode (FIG. 8B), a tertiary mode (FIG. 8C), and a quaternary mode (FIG. 8D). In this case, for example, a region A is in a (+) pressure oscillation mode, and a region B is in a (−) pressure oscillation mode. In this state, the shapes (lengths or diameters) of the restrictors 45 are set to amplify pressure oscillation at a preset certain frequency, and the amplified pressure oscillation of the frequency is attenuated with the resonator 26 provided on the combustion chamber 12.

For example, the shapes of the restrictors 45 are set in accordance with the secondary mode to amplify the pressure oscillation of the secondary mode. Specifically, as illustrated in FIG. 8B, the lengths of the restrictors 45 in the regions A are reduced (or the internal diameters thereof are reduced), and the lengths of the restrictors 45 in the regions B are increased (or the internal diameters thereof are increased). As another example, the lengths of the restrictors 45 in the regions A are increased (or the internal diameters thereof are increased), and the lengths of the restrictors 45 in the regions B are reduced (or the internal diameters thereof are reduced). Which of them is to be selected is determined in advance by experiments or analysis. In this manner, as illustrated with a two-dot chain line in FIG. 7, pressure oscillation with respect to the frequency is amplified in the secondary mode (FIG. 8B), and reduced in the primary mode (FIG. 8A), the tertiary mode (FIG. 8C), and the quaternary mode (FIG. 8D). The amplified pressure oscillation in the secondary mode (FIG. 8B) is attenuated with the resonator 26.

In this example, the shapes of the restrictors 45 are set in accordance with the secondary mode to amplify the pressure oscillation in the secondary mode, but one of the primary mode, the tertiary mode, and the quaternary mode may be amplified. In this case, a structure is desirably adopted to amplify pressure oscillation of the mode with the highest pressure oscillation.

As described above, in the injection device according to the second embodiment, restrictors 45 in injectors 22, 23, and 24 are set to have different shapes (lengths or internal diameters), in accordance with the pressure oscillation mode occurring in the combustion chamber 12. This structure effectively reduces pressure oscillation occurring in the combustion chamber 12.

In addition, in the injection device according to the second embodiment, the shapes of the restrictors 45 are set to amplify pressure oscillation of a preset certain frequency. With this structure, although the pressure oscillation of the certain frequency is amplified according to the set shapes of the restrictors 45, pressure oscillation of the other frequencies is reduced, and the amplified pressure oscillation is attenuated with the resonator 26. This structure reduces pressure oscillation occurring in the combustion chamber 12 as a whole.

In the embodiments described above, the shapes (lengths or internal diameters) of the restrictors 45*a*, 45*b*, 45*c*, and 45*d* in the injectors 22A, 22B, 22C, and 22D are set different in the injectors 22, but the shapes lengths or internal diameters) of some of the restrictors may be set different. As another example, the shapes (lengths or internal diameters) of the restrictors in the concentrically arranged injectors may be set different. In addition, the same structure may be applied to the injectors 23 and 24.

Each of the embodiments described above is provided with a plurality of injectors 22, 23, and 24 having different lengths, but all the injectors may have the same length.

REFERENCE SIGNS LIST

10 combustor
11 injection device
12 combustion chamber
13 nozzle
21 injection device main body (device main body)
22, 22A, 22B, 22C, 22D, 23, 24 injector
25 injection surface
26 resonator
27 communication path
28 circumferential wall portion
31 first partition wall
32 second partition wall
33 oxidant manifold
34 fuel manifold
41*a*, 41*b* lox post
42*a*, 42*b* sleeve
43*a*, 43*b* LOx channel (oxidant channel)
44*a*, 44*b* introduction portion
45*a*, 45*b*, 45*c*, 45*d* restrictor
46*a*, 46*b* recessed portion
47*a*, 47*b* $GH_2$ channel (fuel channel)
48*a*, 48*b* introduction port
101 fuel supply line
102 oxidant supply line

The invention claimed is:

1. An injection device comprising:
    a device main body partitioned into a fuel manifold and an oxidant manifold; and
    a plurality of injectors arranged at predetermined intervals in the device main body and being configured to inject fuel and oxidant into a combustion chamber of a rocket engine, wherein
    the plurality of injectors each includes
    an oxidant channel including a proximal end portion communicating with the oxidant manifold and a distal end portion communicating with the combustion chamber,
    a restrictor provided on the proximal end portion of the oxidant channel, and
    a fuel channel including a proximal end portion communicating with the fuel manifold and a distal end portion communicating with the combustion chamber,
    the restrictors in the plurality of injectors have different shapes,
    the shapes of the restrictors in the plurality of injectors are set different in accordance with a pressure oscillation mode occurring in the combustion chamber, and
    the shapes of the restrictors are set to amplify pressure oscillation of a preset certain frequency, and the combustion chamber communicates with a resonator configured to attenuate the pressure oscillation of the certain frequency.

2. The injection device according to claim 1, wherein the restrictors of the plurality of injectors have different lengths.

3. The injection device according to claim 1, wherein the restrictors of the plurality of injectors have different internal diameters.

4. The injection device according to claim 1, wherein the plurality of injectors are arranged concentrically in the device main body along a radial direction, and the restrictors of the plurality of injectors arranged along the radial direction have different shapes.

5. A combustor comprising:
    the injection device according claim 1;
    the combustion chamber configured to combust oxidant and fuel injected from the injection device to generate combustion gas; and
    a nozzle configured to inject the combustion gas generated in the combustion chamber.

6. A rocket engine comprising:
    the combustor according to claim 5;
    an oxidant supply device configured to supply oxidant to the combustor; and
    a fuel supply device configured to supply fuel to the combustor.

* * * * *